(12) United States Patent
Horne

(10) Patent No.: US 8,734,739 B2
(45) Date of Patent: May 27, 2014

(54) PROCESS FOR TREATING SPENT PICKLE LIQUOR AND/OR FERROUS CHLORIDE

(76) Inventor: Ronald L. Horne, San Felipe, TX (US)

( * ) Notice: Subject to any disclaimer, the term of this patent is extended or adjusted under 35 U.S.C. 154(b) by 5 days.

(21) Appl. No.: 13/567,574

(22) Filed: Aug. 6, 2012

(65) Prior Publication Data

US 2014/0037520 A1    Feb. 6, 2014

(51) Int. Cl.
*B01J 14/00* (2006.01)
*B01J 19/00* (2006.01)
*C01B 17/96* (2006.01)
*C01G 49/14* (2006.01)

(52) U.S. Cl.
USPC ........... 423/138; 423/146; 423/147; 423/558; 423/DIG. 1; 423/DIG. 2; 422/129

(58) Field of Classification Search
USPC ....... 423/138, 146, 147, 558, DIG. 1, DIG. 2; 422/129
See application file for complete search history.

(56) References Cited

U.S. PATENT DOCUMENTS 3,743,484 A * 7/1973 Morimoto ................. 23/306
5,266,297 A * 11/1993 Kodama ................... 423/548

* cited by examiner

*Primary Examiner* — Timothy Vanoy

(74) *Attorney, Agent, or Firm* — Egbert Law Offices, PLLC

(57) ABSTRACT

A process for treating spent pickle liquor has the steps of mixing the spent pickle liquor with sulfuric acid, introducing oxygen into the mixture of spent pickle liquor and the sulfuric acid for a period of time, and producing diiron(II) tetrachlorosulfate from the oxygen-introduced mixture of sulfuric acid and spent pickle liquor. The spent pickle liquor and the sulfuric acid are introduced into a column. The oxygen is passed under pressure into the column. The intimate mixture of spent pickle liquor, sulfuric acid and oxygen are maintained under pressure for a period of time.

19 Claims, 1 Drawing Sheet

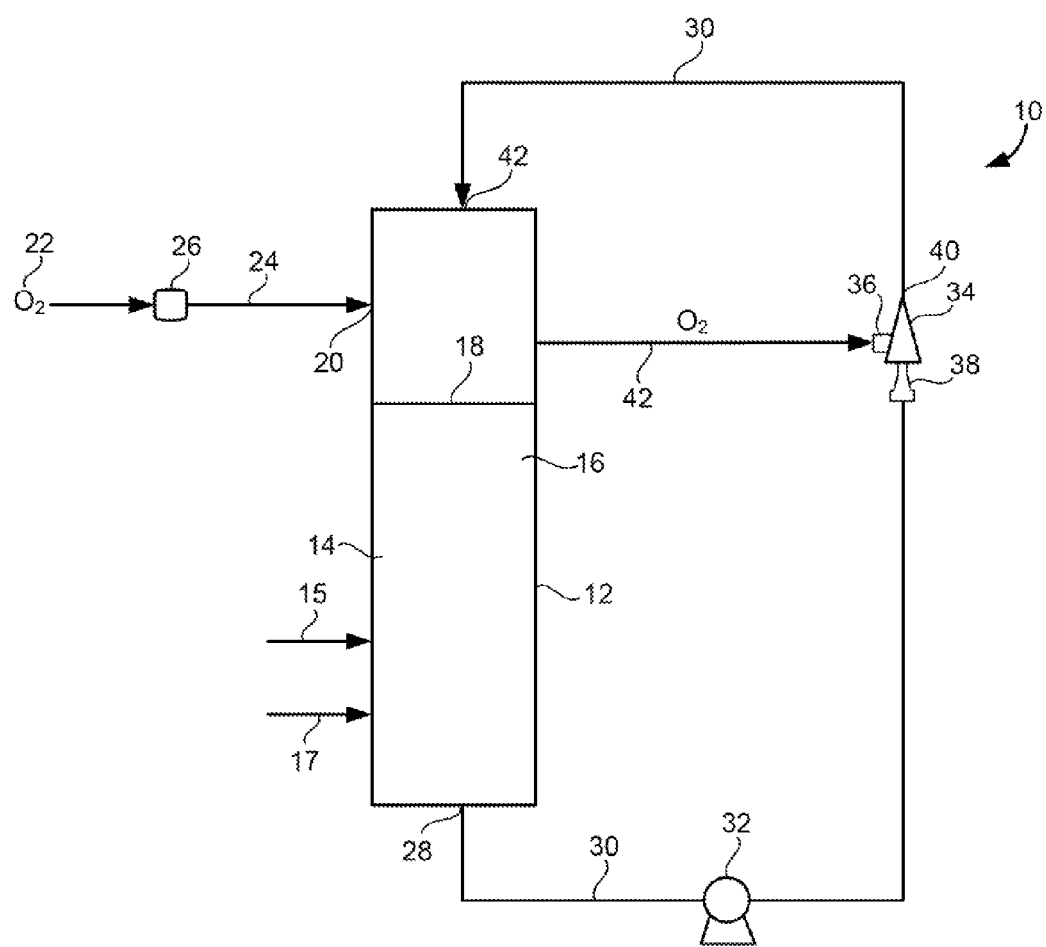

PROCESS FOR TREATING SPENT PICKLE LIQUOR AND/OR FERROUS CHLORIDE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to processes for treating spent pickle liquors and/or ferrous chloride. More particularly, the present invention the relates to process for treating such spent pickle liquor without the use of chlorine. The present invention also relates to processes for treating spent pickle liquor in which the end product of the treatment process is useful for other purposes.

2. Description of Related Art Including Information Disclosed Under 37 CFR 1.97 and 37 CFR 1.98.

The process of pickling steel mill products to remove iron scale is well known. Typically, the articles from which the iron scale is to be removed are placed in an acid pickling bath. The acid bath is most commonly a sulphuric acid bath in which the strength of the acid generally varies from about 5 to 7%. As the pickling operations proceed, the acid strength of the bath gradually reduces, and acid is added to maintain its strength. However, when the iron content of the bath, due to dissolved scale, increases to approximately 7% iron or 20% ferrous sulfate, the operation becomes inefficient and the operator starts to "kill" the bath which involves allowing the bath to fall below 5% acid by not adding any more acid. The bath is then dumped and a new batch of acid is made up for pickling purposes.

The spent pickling bath is commonly referred to as waste pickle liquor and presents a disposal problem in that its acid and iron content renders it unsuitable for drainage into streams. Various methods have been proposed for neutralizing the waste pickle liquor. One method has been to add iron which reacts with the acid of the liquor to form iron sulfate which is then recovered by suitable processes. Another method of treating involves neutralizing the acid with an alkali such as lime, soda ash, or caustic soda.

The neutralization of waste pickle liquor with lime, soda ash, or caustic soda necessitates expensive equipment and many handling operations. It is necessary to provide proportioning apparatus for mixing the alkali with water to form a slurry. A mixer must be provided in which the slurry is mixed with the waste pickle liquor. In the case of caustic soda, a heat exchanger for cooling the material coming from the proportioning apparatus must be provided. From the mixing tank, the waste material must be transferred to a settling tank wherein the solids, mainly calcium sulfate, are allowed to settle from the liquid in which they are suspended. These solids form a sludge which presents another difficult and expensive disposal problem.

Another technique has been to add chlorine to the ferrous chloride component of the spent pickle liquor. The addition of this chlorine will create ferric chloride. The ferric chloride can then be utilized for other purposes.

Unfortunately, the use of chlorine is inherently difficult. Often, when chlorine is transported by train or by truck, accidents can occur which cause the release of hazardous chlorine into the environment. This can also evolve the evacuation of hundreds of persons from the surrounding area. Extensive clean-up efforts are required in order to remove the chlorine from the contaminated environment.

In other circumstances, special chlorine facilities are constructed in an area adjacent to the supply of the spent pickle liquor. The chlorine facilities are difficult and expensive to develop. Additionally, these processes also further add chlorine to the ferrous chloride. As such, further chlorine is introduced into the environment through the use of such facilities. As such, it is desirable to create a suitable product from the spent pickle liquor which does not involve the use of chlorine.

In the past, various patents have issued relating to the treatment of pickle liquor. For example, U.S. Pat. No. 2,433,458, issued on Dec. 30, 1947 to Kahn et al., describes a process for treating pickle liquor. This process involves the step of mixing the pickle liquor with an amount of an aqueous suspension of magnesium hydroxide sufficient to bring the pH of the pickle liquor to approximately 6.0. Ferric hydroxide is precipitated therefrom. The liquid is then separated from the precipitate. An amount of calcium hydroxide is then added so as to increase the pH of the pickle liquor to approximately 8.5. The balance of the iron can then be precipitated therefrom.

U.S. Pat. No. 2,583,098, issued on Jan. 22, 1952 to Heise et al., shows another process for the treatment of waste pickle liquor. This process involves the step of removing a pickling inhibitor from the pickle liquor and then passing the liquor to an electrolytic cell having a cathode upon which iron can plate and a porous anode. The liquor is electrolyzed in the cell at a temperature of up to 40° C. Iron from the liquor is plated onto the cathode and passed through the anode so as to oxidize only a portion ferrous iron into the liquor at the anode from the ferrous to the ferric.

U.S. Pat. No. 2,746,920, issued on May 22, 1956 to J. M. Wunderley, shows a process for the neutralization of spent pickle liquor. This process includes the steps of continuously feeding proportioned quantities of the liquor and a granulated blast furnace slag into a zone to form a slurry thereof. The slurry is continuously withdrawn from the zone. The withdrawn slurry is subjected to continuous mixing so as to cause the acid in the solution to be substantially neutralized and such that the solution is absorbed into the slag for reaction therewith. The reaction products are deposited upon inner and outer surfaces of the slag. The slag is continuously withdrawn for air drying and fixation of the reaction products in the slag.

U.S. Pat. No. 2,623,849, issued on Dec. 30, 1952 to H. L., Peterson, describes a method of treating spent ferrous material pickle liquor in which the mineral acids are neutralized. The metallic oxides are precipitated by introducing a neutralizing treating agent into this spent liquor. The neutralizing treating agent has a saponified fat content and an alkali content in a quality sufficient to effect a curd formation.

U.S. Pat. No. 2,775,508, issued on Dec. 25, 1956 to A. M. Thompsen, discloses a method of treating pickle liquors for the recovery of iron therefrom. The method includes the steps of forming a reagent solution consisting essentially of a mixture of a substantially iron-free aqueous solution of ammonium sulfate and the reaction products of ammonia and carbon dioxide. The reagent solution is added to the pickle liquor to precipitate, principally as iron carbonates, the major part of the iron resistance in the pickle liquor. The iron precipitate is removed by filtration to provide a solution of ammonium sulfate.

U.S. Pat. No. 3,211,538, issued on Oct. 12, 1965 to Gross et al., provides a process for the concentration of sulfuric acid pickle liquor. The ferrous sulfate is substantially completely recovered as solid ferrous sulfate mono-hydrate. The pickle liquor is combined with strong sulfuric acid to form a combined liquid stream. A hot drying gas stream is generated. The drying gas stream is accelerated to a high velocity by passing the drying gas stream downward to a passage defined by downwardly converging side walls. The combined liquid stream is in transverse contact with the accelerated stream of hot drying gas. The combined liquid stream is dispersed into the hot gas stream in the form of fine liquid droplets whereby sudden evaporation of liquid water into the gas stream takes place. The resulting moisture-laden gas stream is separated from the remaining liquid phase. The liquid phase is collected as a slurry of solid crystals of ferrous sulfate mono-hydrate in strong sulfuric acid. The solid crystals are filtered from the slurry.

U.S. Pat. No. 3,442,608, issued on May 6, 1969 to Addinall et al., provides a process for the regeneration of waste pickle liquors. An aqueous chlorine solution is fed in pulsed discreet portions into a reaction chamber. The reaction chamber is externally heated such that the reactants of the process are maintained separate from any product of combustion. An oxidizing atmosphere is provided for vaporizing free water and hydrochloric acid for the evolution of steam and gaseous hydrochloric acid with the attendant deposition of hydrated metal chloride on the heated surface and for oxidizing and dehydration the metal chloride and hydrolyzing the oxidize metal chloride by reaction with steam by vaporization of the aqueous solution fed to the heated surface in proximity to the oxidize metal chloride.

U.S. Pat. No. 4,149,946, issued on Apr. 17, 1979 to Z. L. Burke, discloses the recovery of spent pickle liquor and iron metals. The spent pickle liquor ion is regenerated and iron metal is recovered therefrom by electrolysis in a cell having an anode in an anode chamber and a cathode in a cathode chamber separated by a cation-selective membrane. The spent pickle liquor is placed in the cathode chamber and aqueous ammonium sulfate solution is placed in the anode chamber. Electrical current is passed through the cell. Ammonium ions pass through the membrane into the cathode chamber to form an aqueous ammonium sulfate solution. The ammonium sulfate anolyte is converted to sulfuric acid solution useful for pickling.

U.S. Pat. No. 5,057,290, issued on Oct. 15, 1991 to Peterson et al., discloses a process and apparatus for the low temperature recovery of ferrous chloride from spent pickle liquors. The process includes maintaining the hydrochloric, acid and iron concentrations within the spent pickle liquor at levels that will prevent the liquor from freezing when cooled to about $-10°F$. and that will permit the formation of ferrous chloride crystals within the spent pickle liquor when the liquor is cooled below about $+10°$ F. to $20°$ F. and to about $-10°$ F. The ferrous chloride crystals formed at such low temperatures are then removed from the pickle liquor. This permits reuse of the free hydrochloric acid remaining within the thus regenerated pickle liquor.

U.S. Pat. No. 5,344,572, issued on Sep. 6, 1994 to S. C. Wadhawan, discloses another method for treating waste pickle liquor. This method includes the steps of adding a flocculating agent to the pickle liquor solution, allowing at least some of the silica in the pickle liquor to begin to flocculate, again adding a flocculating agent to the pickle liquor solution, allowing the floccules containing silica to increase in size, and physically separating floccules from the pickle liquor solution.

It is an object of the present invention to provide a process for treating spent pickle liquor which avoids the addition of chlorine in the processes.

It is still another object of the present invention to provide a process for treating waste pickle liquor which avoids the use of hydrochloric acid.

It is another object of the present invention to provide a process for treating spent pickle liquor which avoids any transport of chlorine.

It is still another object of the present invention provide a process for treating spent pickle liquor which can effectively convert the ferrous chloride into a marketable product.

It is still another object of the present invention provide a process for treating spent pickle liquor which maximizes the amount of ferric chloride produced per liquid volume.

It is still another object of the present invention to provide a process for treating spent pickle liquor which produces a coagulant that can be useful in water treatment.

It is still a further object of the present invention to provide a process for treating spent pickle liquor which allows the reactions with the spent pickle liquor to be carried without adding heat to the process.

These and other objects and advantages of the present invention will become apparent from a reading of the attached specification and appended claims.

BRIEF SUMMARY OF THE INVENTION

The present invention is a process for treating spect pickle liquor. The process includes the steps of (1) nixing the spent pickle liquor with sulfuric acid; (2) introducing oxygen into the mixture of spent pickle liquor and the sulfuric acid for a period of time and (3) producing diiron(II) tetrachlorosulfate from the oxygen-introduced mixture of sulfuric acid and spent pickle liquor.

The step of mixing includes the steps of introducing the spent pickle liquor into a column, and adding the sulfuric acid to the spent pickle liquor in the column. The oxygen is passed under pressure into the column. The spent pickle liquor and the sulfuric acid flows outwardly of the column along a line. Oxygen is introduced in the flowing spent pickle liquor and sulfuric, acid in the line. The mixture of the oxygen, the spent pickle liquor and the sulfuric acid is delivered back into the column. An eductor is formed on the line. This eductor has a first inlet port, a second line port and an outlet. The oxygen so introduced directly into the first port of the eductor. The spent pickle liquor and the sulfuric acid flow through the second port of the eductor. The mixture is passed from the outlet of the eductor. The mixture of the introduced oxygen and the spent pickle liquor and the sulfuric acid flow back into an upper end of the column. The oxygen is directed outwardly of the column to the first port of the eductor. In particular, the spent pickle liquor and the sulfuric acid are pumped from a bottom of the container. The column will have an internal pressure of approximately 60 psi. The column has an internal temperature of up to $130°$ F.

The present invention is also an apparatus for converting the spent pickle liquor into an iron compound. The apparatus has a column having an interior volume with an oxygen inlet, a liquid inlet and a liquid outlet. The liquid inlet is adjacent a top of the column. The liquid outlet is adjacent a bottom the column. The interior volume of the column is suitable for receiving spent pickle liquor and sulfuric acid therein. A line extends from the liquid outlet of the column. A pump is cooperative with the line so as to draw liquid through the line from the liquid outlet. An oxygen supply is connected to the oxygen inlet so as to pass oxygen under pressure into the interior volume. An eductor is positioned along the line between the ends thereof. The eductor has an oxygen inlet port formed thereon so as to allow oxygen to be passed into the eductor. The eductor allows a mixture of spent pickle liquor and sulfuric acid to be intimately mixed with the oxygen from the oxygen inlet port. A pressure regulator is positioned between the oxygen supply and the oxygen inlet of the column. The pressure regulator is suitable for maintaining the interior volume of the column at a pressure above atmospheric. A supply of the spent pickle liquor is received within the interior volume of the column. A supply of the sulfuric acid is also received within the interior volume of the column.

The foregoing section is described, in generality, the preferred embodiment of the present invention. It is understood that modifications to this preferred embodiment can be made within the scope of the present invention. This section is not to be construed, in any way, as limiting of the scope of the present invention. The present invention should only be limited by the following claims and their legal equivalents.

BRIEF DESCRIPTION OF THE SEVERAL VIEWS OF THE DRAWINGS

FIG. 1 is an illustration of the apparatus and process for the treating of spent pickle liquor in accordance with the preferred embodiment of the present invention.

DETAILED DESCRIPTION OF THE INVENTION

FIG. 1 shows the process 10 in accordance with the preferred embodiment of the present invention. The process 10 has a column 12 having an interior volume 14. The interior volume 14 of the column 12 can contain is liquid 16. Liquid 16 is a mixture of sulfuric acid and spent pickle liquor. The spent pickle liquor will contain ferrous chloride therein. The liquid 16 will have an upper level 18 within the column 12. An oxygen inlet 20 opens to the interior volume 14 of the column 12. An oxygen supply 22 passes oxygen along line 24 into the oxygen inlet 20. A pressure regulator 26 is provided along line 24 so as to maintain a proper pressure of the oxygen within the interior volume 14 of the column 12. The spent pickle liquor is introduced to the column 12 along line 15. The sulfuric acid is added to the spent pickle liquor through line 17.

The column 12 has a liquid outlet 28 located at a bottom thereof. A line 30 is connected to the liquid outlet 28. Pump 32 is cooperative with the liquid in the line 30 so as to pass the liquid 16 from the interior volume 14 of the column 12 outwardly therefrom along line 30.

An eductor 34 is also positioned along line 30. The eductor 34 has a first inlet port 36, a second inlet port 38, and an outlet 40. As can be seen, the oxygen will pass along line 42 from the column 12 to the first inlet port 36. The mixture to the spent pickle liquor and the sulfuric acid flowing through line 30 will pass into the eductor 34 through the second inlet port 38. The eductor 34 is a type of pump that uses a Venturi effect of a converging-diverging nozzle to convert, the pressure energy of a motive fluid to velocity energy which creates a low pressure zone that draws and entrains a suction fluid. After passing through the throat of the eductor, the mixed fluid expands and the velocity is reduced which results in recompressing the mixed fluid by converting velocity energy back into pressure energy. The motive fluid, in the present case, is the liquid 16 (i.e. the mixture of the spent pickle liquor and sulfuric acid). The entrained suction fluid can be the oxygen 32. The Venturi effect applies to the operation of the device. Fluid under high pressure is converted into a high-velocity jet at the throat of the convergent-divergent nozzle which creates a low pressure at that point. The low pressure draws the suction fluid into the convergent-divergent nozzle where it mixes with the motive fluid. As a result, an intimate mixture of the oxygen 22 with the liquid 16 is achieved at the eductor 34. This intimate mixture then passes along line 30 back to the first inlet 42 located at the top of the column 12. As a result of this configuration, a continuous cycling and mixing of the oxygen with the sulfuric acid and spent pickle liquor is achieved within the column 12.

The present invention utilizes sulfuric acid with the ferrous chloride in the spent pickle liquor so as to produce an iron compound. In particular, the formula that results in this compound is as follows:

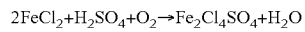

As a result, this product is now in a diiron(II) tetrachlorosulfate. This is product that is not diluted, in any way, by the sulfuric acid. The sulfuric acid that is used is approximately 90% active. This is contrast to other solutions which utilizes hydrochloric acid. Hydrochloric acid is only 36% active in a normal solution. As such, it is a relatively dilute product. As a result, any iron compound that is produced as a result of the reaction of hydrochloric acid with the ferrous chloride will be approximately two-thirds diluted. As a result, the iron compound in the diiron(II) tetrachlorosulfate will be approximately three times the iron content of the any processes which would utilize hydrochloric acid. The process of the present invention essentially converts the ferrous iron in the spent pickle liquor into a ferric iron.

In normal use, the pressure regulator 26 will assure that the pressure within the interior volume 14 of the column 12 is maintained at approximately 60 p.s.i. The process 10 can continue to circulate for approximately twelve hours at ambient temperatures. The exothermic reaction caused by the components of the process will generally increase the temperature within the column 12 to up to 130° F. As a result of the process of the present invention, the iron compound is created without the addition of heat of the process. Ultimately, within the concept of the present invention if additional pressures and temperatures were applied to column 12, the reaction would occur much faster and the product could be produced more quickly. However, the use of heat requires the addition of fuel and adds cost to the process. The avoidance of heat greatly simplifies the process, enhances the safety of the process, and minimizes the cost of the process.

The result of the process 10 is a iron compound and, in particular, ferric sulfate, that has been produced at significantly less costs. Ultimately, the marketable product can be utilized as a coagulant in waste treatment processes. As such, the essentially waste pickle liquor is converted to a highly marketable and valuable product. The present invention maximizes the amount of iron per liquid volume. Under all circumstances, the present invention avoids the introduction of chlorine into the process. As such, chlorine tanks, chlorine facilities and chlorine are avoided.

The foregoing disclosure and description of the invention is illustrative and explanatory thereof. Various changes in the steps of the described process or in the elements of the described construction can be made within the scope of the appended claims without departing from the true spirit of the invention. The present invention should only be limited by the following claims and their legal equivalents.

I claim:

1. A process for treating spent pickle liquor comprising:
   mixing the spent pickle liquor with sulfuric acid;
   introducing oxygen into the mixture of spent pickle liquor and the sulfuric acid for a period of time; and
   producing diiron(II) tetrachlorosulfate from the oxygen-introduced mixture of sulfuric acid and spent pickle liquor.

2. The process of claim 1, the step of mixing comprising:
   introducing the spent pickle liquor into a column; and
   adding the sulfuric acid to the spent pickle liquor in the column.

3. The process of claim 2, the step of introducing oxygen comprising:
   passing oxygen under pressure into said column.

4. The process of claim 3, the step of introducing oxygen comprising:
   flowing the spent pickle liquor and the sulfuric acid outwardly of said column along a line;
   introducing the oxygen into the flowing spent pick e liquor and sulfuric acid in said line; and
   delivering the introduced oxygen and the spent pickle liquor and the sulfuric acid back into said column.

5. The process of claim 4, further comprising:
   forming an eductor on said line, the eductor having a first inlet port and a second line port and an outlet, the oxygen being introduced directly into said first port of said eductor, the spent pickle liquor and the sulfuric acid flowing through said second port of said eductor; and
   outputting the mixture of the introducing oxygen and the spent pickle liquor and the sulfuric acid from said outlet of said eductor.

6. The process of claim 5, the mixture of the introduced oxygen and the spent pickle liquor and the sulfuric acid flowing back into an upper end of said column.

7. The process of Claim 5, the oxygen introduced under pressure into said column being directed outwardly of said column to said first port of said eductor.

8. The process of claim 4, the step of flowing the spent pickle liquor and the sulfuric acid comprising:
   pumping the spent pickle liquor and the sulfuric acid from a bottom of said column.

9. The process of claim 2, said column having an internal pressure of approximately 60 p.s.i., said column having an internal temperature of up to 130° F.

10. The process of claim 1 further comprising:
    forming an intimate mixture of the spent pickle liquor and the sulfuric acid and the oxygen; and
    maintaining the intimate mixture under pressure for a period of time.

11. The process of claim 10, said period of time being approximately 12 hours, said pressure being approximately 60 p.s.i.

12. A process for converting a ferrous chloride into a ferric chloride compound comprising:
    mixing the ferrous chloride with a sulfuric acid;
    introducing oxygen into the mixture of ferrous chloride and the sulfuric acid for a period of time; and
    producing an iron compound from the oxygen-introduced mixture of sulfuric acid and ferrous chloride.

13. The process of claim 12, the step of mixing comprising:
    introducing the ferrous chloride into a column; and
    adding the sulfuric acid to the ferrous chloride in said column.

14. The process of claim 13, the step of introducing oxygen comprising:
    passing oxygen under pressure into said column.

15. The process of claim 14, the step of introducing oxygen comprising:
    flowing the ferric chloride compound and the sulfuric acid outwardly of said column along a line;
    introducing the oxygen into the flowing ferrous chloride and sulfuric acid in said line; and
    delivering the introduced-oxygen and the ferrous chloride and the sulfuric acid back into said column.

16. The process of Claim 15, further comprising:
    forming an eductor along said line, said eductor having a first inlet port and a second line port and an outlet, the oxygen being introduced directly into said first port of said eductor, the ferrous chloride and the sulfuric acid flowing through said second port of said eductor; and
    outputting the mixture of the introducing oxygen and the ferrous chloride and the sulfuric acid from said outlet of said eductor into said line and back into said column.

17. The process of claim 12, the iron compound being diiron(II) tetrachlorosulfate.

18. An apparatus for convening spent pickle liquor into an iron compound, the apparatus comprising:
    a column having an interior volume suitable for receiving the spent pickle liquor and sulfuric acid therein, said column having an oxygen inlet and a liquid inlet, said liquid inlet being adjacent a top of said column, said column having a liquid outlet adjacent a bottom thereof;
    a line extending from said liquid outlet of said column, said line having an opposite end connected to said fluid inlet;
    a pump cooperative with said line so as to draw liquid through said line from said liquid outlet;
    an oxygen supply connected to said oxygen inlet so as to pass oxygen under pressure into said interior volume;
    an eductor positioned along said line between the ends thereof, said eductor having an oxygen inlet port formed thereon so as to allow oxygen to be passed into said eductor, said eductor allowing an the mixture of spent pickle liquor and sulfuric acid to be intimately mixed with the oxygen from said oxygen inlet port; and
    a pressure regulator positioned between said oxygen supply and said oxygen inlet of said column, said pressure regulator suitable for maintaining said interior volume of said column at a pressure above atmospheric.

19. The apparatus of claim 18, further comprising:
    a supply of the spent pickle liquor received within said interior volume of said column; and
    a supply of the sulfuric acid received within said interior volume of said column.

* * * * *